United States Patent [19]

Nishizawa et al.

[11] Patent Number: 5,313,561
[45] Date of Patent: May 17, 1994

[54] REASONING SYSTEM BY KNOWLEDGE ACTIVATION AND COMPOSING METHOD OF SAME

[75] Inventors: Yasuo Nishizawa, Hitachioota; Yukio Nagaoka, Toukai, both of Japan

[73] Assignee: Hitachi, Ltd, Tokyo, Japan

[21] Appl. No.: 767,905

[22] Filed: Sep. 30, 1991

[30] Foreign Application Priority Data

Sep. 28, 1990 [JP] Japan ............................... 2-256927

[51] Int. Cl.[5] .......................... G06F 9/44; G06F 15/18
[52] U.S. Cl. ..................................... 395/61; 395/900; 395/77; 395/919
[58] Field of Search .................... 395/61, 77, 51, 60, 395/62

[56] References Cited

U.S. PATENT DOCUMENTS 4,939,680  7/1990  Yoshida .............................. 395/10
5,016,204  5/1991  Simoudis et al. ................... 395/11

OTHER PUBLICATIONS

Sanders, "Computers Today With Basic," McGraw-Hill, (1988), p. 23.
Waterman, "A Guide to Expert Systems," Addison-Wesley, (1986), pp. 90-91.
Barr et al, "Handbook of Artificial Intelligence", vol. II, Addison-Wesley, (1982), pp. 89-90.
Saito et al, "Rule Extraction from Facts with Neural Networks", INNC 90, Paris, Jul., 1990, pp. 379-382.
Langley "Exploring the Space of Cognitive Architectures", Behavior Research Methods & Instrumentation, 1983, vol. 15 (2), 289-299.
Gabrielian et al., "Hierarchical Representation of Causal Knowledge", Proceedings Western Conference on Expert Systems, Jun. 1987, 82-89.
Lee et al., "Dynamic Causal Model Construction for Model Based Reasoning", Proceedings Western Conference on Expert Systems, Jun. 1987, 90-95.
Cantone et al., "IN-ATE: Fault Diagnosis as Expert System Guided Search", Proc. Air Force Workshop on Artificial Intelligence Appl. for Integrated Diagnostics, Jul. 1987, 298-348.

Primary Examiner—Michael R. Fleming
Assistant Examiner—Robert W. Downs
Attorney, Agent, or Firm—Antonelli, Terry, Stout & Kraus

[57] ABSTRACT

The reasoning system by knowledge activation of the present invention stores shallow knowledge and deep knowledge in memories. The reasoning by the reasoning mechanism is executed using the shallow knowledge. In case of the shallow knowledge to be used in the reasoning is not stored, the deep knowledge is used in the execution of the reasoning. Based on the information which is obtained by the execution of the reasoning, shallow knowledge is newly acquired. The reasoning system by knowledge activation needs only a short time for reasoning. Even in the case where shallow knowledge which is necessary for fast reasoning is not stored, the execution of the reasoning is possible, and new shallow knowledge is easily obtainable.

8 Claims, 12 Drawing Sheets

FIG. 3

| S1 | COMPONENTS | {B1, B2, V1, V2, V3, V4, F1, F2} |
|---|---|---|
| | ENTRANCE | {B1} |
| | EXIT | {B2} |
| | STOP_LINE | {NONE} |

FIG. 4

| F1 | UPPER_SYSTEM | S1 |
|---|---|---|
| | LINE | PIPING_01 |
| | INPUT_DEVICE_1 | V1 |
| | OUTPUT_DEVICE_1 | V2 |
| | INPUT_OUTPUT_RELATION | func_f1 |

FIG. 5

```
(MACRO_RULE_005
    if      (S2      @STOP_LINE        = {PIPING 04 } )
            (B3      @INPUT_CHANGE_1   = [+]
                     @INPUT_CHANGE_2   = [0]
                     @INPUT_CHANGE_3   = [0]             )
    then    (write   B4   @OUTPUT_CHANGE_1      [+]   )
            (write   B4   @OUTPUT_CHANGE_2      [0]   )
            (write   B4   @OUTPUT_CHANGE_3      [0]   ) )
```

FIG. 6

```
(CALC_OUTPUT
    if      (?DEVICE_x     @INPUT_CHANGE=CALCULATED
                           @OUTPUT_CHANGE=UNDEFINED
                           @INPUT_CHANGE_1=?x1
                           @INPUT_CHANGE_2=?x2
                           @INPUT_CHANGE_3=?x3           )
    then    (exec_func    (?DEVICE_x, ?x1, ?x2, ?x3    ) )
```

FIG. 7

```
(MAKE_RULE_1
    if      (?SUBSYSTEM_x  @ENTRANCE    *=?DEVICE_x
                           @EXIT        *=?DEVICE_y)
            (?DEVICE_x     @INPUT_CHANGE=CALCULATED )
            (?DEVICE_y     @OUTPUT_CHANGE=CALCULATED)
    then    (make_rule_1   (?DEVICE_x, ?DEVICE_y       ) )
```

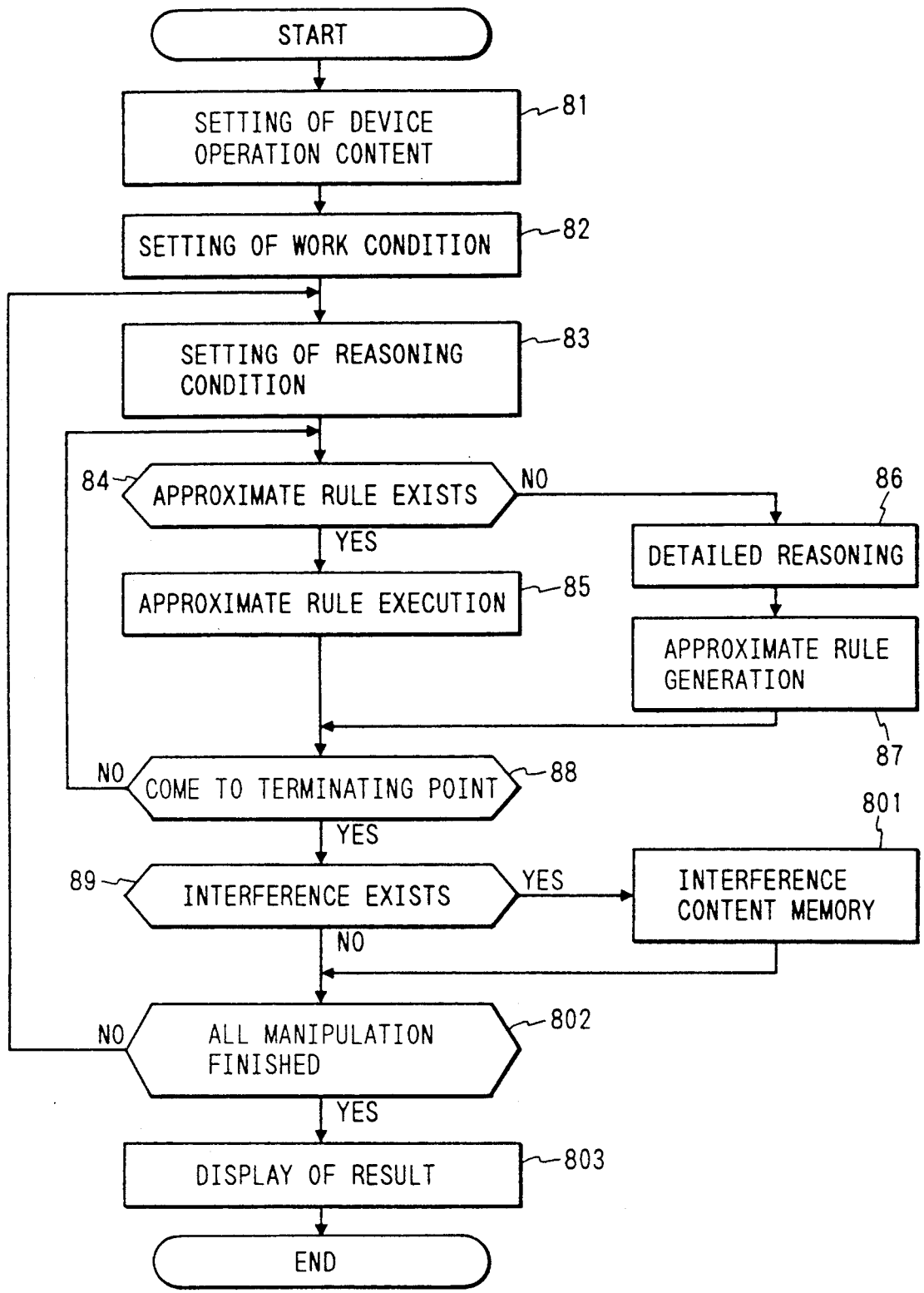

FIG. 16

```
(MAKE_RULE_2
    if    (?SUBSYSTEM_x    @OPERATING_DEVICE    = ?DEVICE_x
                           @OPERATION_CONTENT   = ?OPERATION_x
                           @OUTLET              = ?DEVICE_y
          (?DEVICE_x       @OUTPUT_CHANGE       = CALCULATED
          (?DEVICE_y       @OUTPUT_CHANGE       = CALCULATED
    then  (make_rule_2   (?DEVICE_x, ?DEVICE_y) )
```

FIG. 17

```
(MACRO_RULE_009
    if    (S2    @STOP_LINE        = {PIPING_03 }
                 @INPUT_CHANGE_1   = [+]
                 @INPUT_CHANGE_2   = [0]
                 @INPUT_CHANGE_3   = [0]           )
    then  (write  B4   @OUTPUT_CHANGE_1   [+]     )
          (write  B4   @OUTPUT_CHANGE_2   [0]     )
          (write  B4   @OUTPUT_CHANGE_3   [0]     ) )
```

REASONING SYSTEM BY KNOWLEDGE ACTIVATION AND COMPOSING METHOD OF SAME

BACKGROUND OF THE INVENTION

1. Field of the Invention the present invention relates to a reasoning system by knowledge activation for automatic generation of rules to execute rapid reasoning for solving problems, and composing method thereof.

2. Description of the Prior Art

A reasoning system by knowledge activation having a knowledge obtaining mechanism, a failure diagnosis system for mechanical systems (Jyoho Syori Gakkaishi 30.5 (1989) and a knowledge base system (JP-A-63-271534 (1988) having a function for generating new logically correct rules from conventional knowledge have been disclosed. The failure diagnosis system described above is a system for discovering failed members based on structure of apparatus and behavior of composing members, and the system generates knowledge relating to failure of the composing members by eliminating candidates in normal condition from a group of failed member candidates enumerated from data of reasoning process. And the knowledge based system described above prepares new knowledge by the conversion of conventional knowledge stored in a knowledge base in another logically equivalent expression form.

The above described systems have an advantage to generate knowledge which is not ready previously and to enable the knowledge be utilized for solving problems. However, it is necessary for a reasoning system by knowledge activation to have a mechanism to generate selectively effective new knowledge for solving problems when a function to generate knowledge is provided to the reasoning system by knowledge activation. Reasoning system by knowledge activation without the function described above have following problems.

a) The quantity of knowledge is increased because of generation of unnecessary knowledge.

b) As the result, reasoning using the knowledge needs long time for collation of condition.

c) Computer memories having large capacity are necessary for storage of a large quantity of knowledge.

Thus, for a large scale reasoning by knowledge activation system, the effective knowledge to solve problems, or in other words, whether or not the generated knowledge is able to reach a solution with the least amount of steps is a crucial point.

SUMMARY OF THE INVENTION (1) Objectives of the Invention

The object of the present invention is to provide a reasoning system by knowledge activation having a function for restraining the above described increment of the knowledge quantity and obtaining reasoning rules to find solutions rapidly.

(2) Methods Solving the Problems:

To achieve the objective described above, in accordance with the present invention, a target region of reasoning is composed hierarchically. An approximate rule to execute reasoning rapidly is assigned to higher hierarchy while a rule to generate the approximate rule for the higher hierarchy by detailed reasoning is assigned to lower hierarchy. Then, in the process of reasoning, the approximate rule is executed when the premise part of the approximate rule is established, and the reasoning at the lower hierarchy is continued when the premise part of the approximate rule has not been established. The approximate rule is generated by combining the premise part and the concluding part of the generation rule, that rule describing the relationship between the premise part and the concluding part of the approximate rule, only when the result of the detailed reasoning satisfies the relationship between the premise part and the concluding part of the generation rule.

In accordance with the method described above, only effective knowledge for solving the problems is selectively generated because new rules are generated only in the case where the result of the detailed reasoning satisfies the relationship between the premise part and the concluding part of the approximate rule. Further, as the generated knowledge executes approximate and fast reasoning at the higher hierarchy, the problems can be effectively resolved.

In other words, in accordance with the present invention, the rule for solving problems rapidly can be obtained by restraining the increment of knowledge quantity.

Moreover, in accordance with the present invention only knowledge which is effective for solving problems can be selectively prepared by the rule which describes preparing condition of the knowledge.

And, in accordance with the reasoning system by knowledge activation of the present invention, the rules for solving problems rapidly are not necessary to prepare the rule previously employed by system engineers or users, because the rules can be generated automatically.

BRIEF DESCRIPTION OF THE DRAWINGS

FIG. 3 is a figure showing an example of the higher hierarchy frame expression;

FIG. 4 is a figure showing an expressive example of the lower hierarchy frame;

FIG. 5 is a figure showing an expressive example of the approximate rule;

FIG. 6 a figure showing an expressive example of the detailed rule;

FIG. 7 is a figure showing an expressive example of the generation rule of approximate rule;

FIGS. 8, 9 (a) 9 (b) are flow charts showing the procedure of the processing when the reasoning system by knowledge activation of the present invention is applied to a plant maintenance work planning support;

FIG. 16 is a figure showing an example of corrected rule; and

FIG. 17 is an example of the rule prepared by changing content of a conventional rule without using the detailed reasoning.

DETAILED DESCRIPTION OF THE EMBODIMENTS

Figure 1:
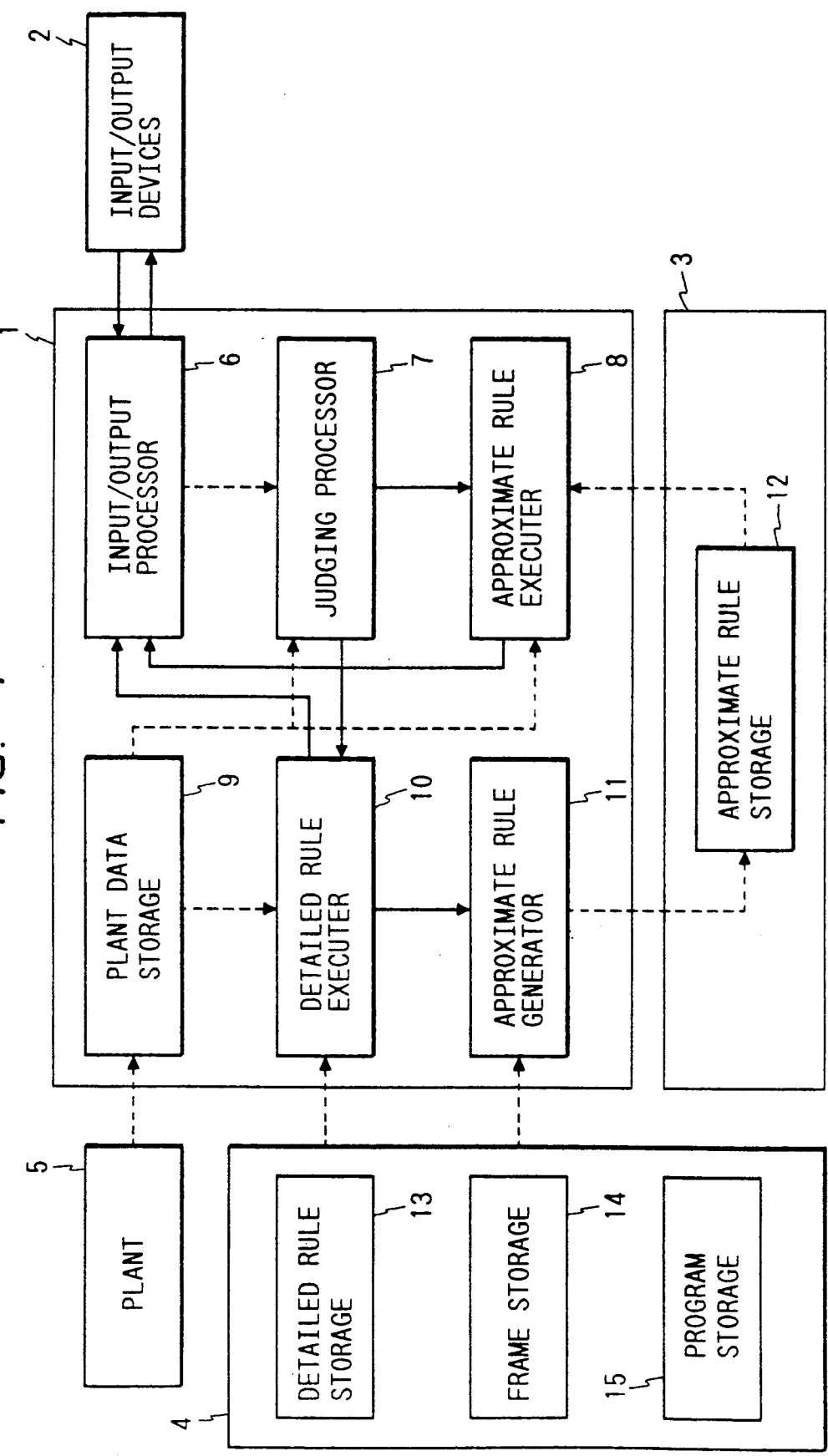
FIG. 1 is a system diagram illustrating an embodiment of the reasoning system by knowledge activation of the present invention.

FIG. 1 is a composing diagram of the reasoning system by knowledge activation of the present invention. In FIG. 1, 1 is a computing apparatus, 2 is input/output devices, 3 and 4 are memories, and 5 is a plant. In the computing apparatus 1, an input/output processor 6 for illustrating processing content of the computer program, a judging processor 7, an approximate rule executer 8, a plant data storage 9, a detailed rule executer 10, and an approximate rule generator part are included. All of the members described above show the content executed in the computing apparatus 1 with blocks. The memory 3 stores the approximate rule. The memory 4 stores detailed rule, the frame defined constitution of the object system and characteristics of component devices, and a program for executing procedure processing. In the above described drawings, arrow-headed real lines show flow of control, and arrow-headed dashed lines show flow of information.

The input/output processor 6 processes the input from the input/output devices 2, and starts the judging processor 7. The input/output processor 6 also transmits the results processed to at the approximate rule executer 8 and detailed rule executer 10 to the input/output devices 2 as outputs. The content of the input and the output is explained later in detail. The judging processor 7 determines whether any approximate rule which coincides with the input condition exists or not, and if it exists, it starts the approximate rule executer 8, but if it does not exist, it starts the detailed rule executer 10. The approximate rule executer 8 executes the concluding part of the approximate rule. The detailed rule executer 10 executes detailed reasoning relating to the object system using the detailed rule. The approximate rule generator part 11 generates approximate rule when a result which satisfies the relationship between the premise part and the concluding part of the approximate rule is obtained by detailed reasoning, and registers to the knowledge base. The data registered in the plant data storage 9 is referred to judging processor 7, approximate rule executer 8, and detailed rule executer 10.

Further, when the reasoning system by knowledge activation of the present invention is used as an offline system, 5 and 6 are not necessary.

Figure 2:
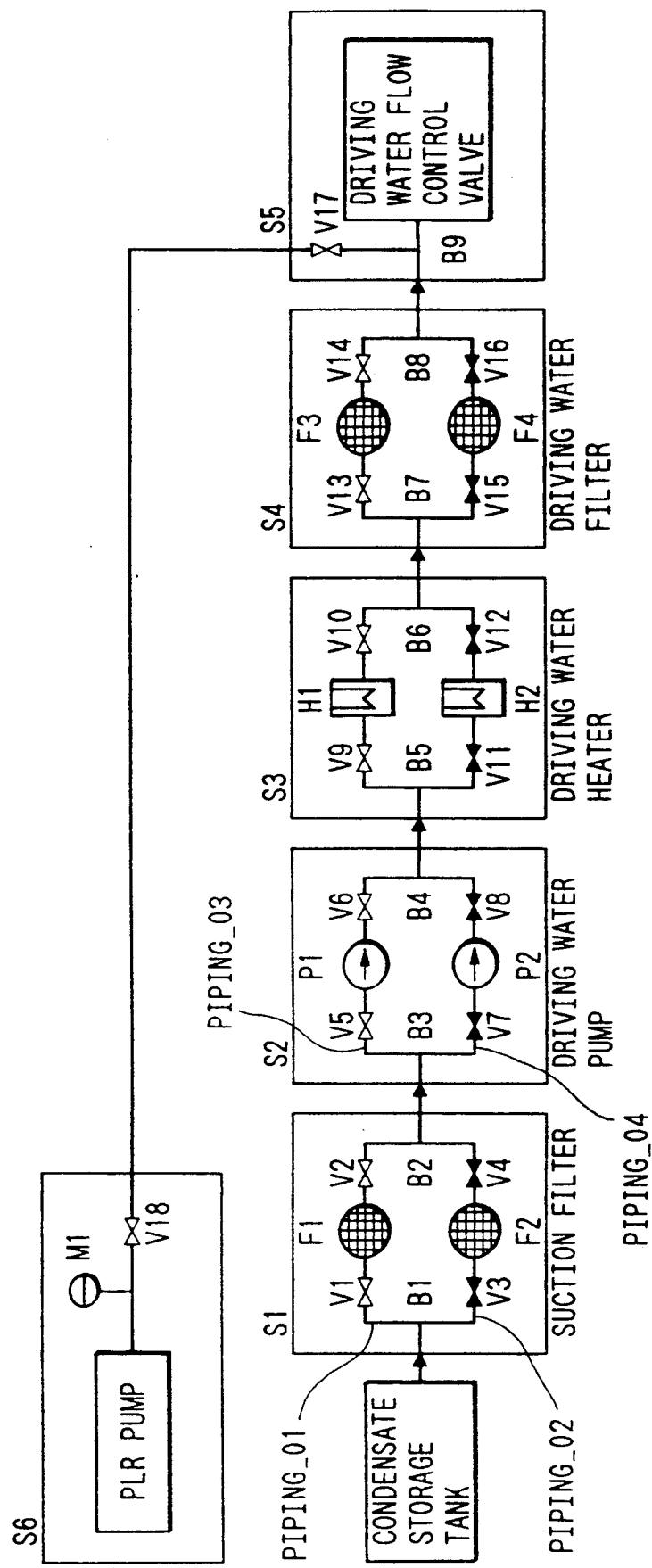
FIG. 2 is a block diagram showing an example of a plant system.

Next, hierarchical expression of the object system of the present invention is explained referring to FIG. 2 diagram and FIGS. 3 and 4 frame figures.

FIG. 2 is a block diagram showing part of a control rod driving hydraulic system for boiling water reactor type nuclear power plants. In the present embodiment, the system shown in FIG. 2 is divided into sub-systems such as S1, S2 etc. (hereinafter called a subsystem). The subsystems S1, S2, etc. are regarded as higher hierarchy, and such devices composing the subsystem S1 and S2 etc. such as valves V1-V18, pumps P1-P2, filters F1-F4, and heaters H1-H2 are regarded as lower hierarchy. In FIG. 2, B1-B2 are branch pipes, M1 is a flowmeter, S1-S5 are parts of control rod driving hydraulic system, and S6 is a part of recirculating system.

FIG. 3 is a frame representing the higher hierarchy S1. The component devices, entrance, exit, and stop line (piping without liquid flow) of the subsystem are shown in frame. The above described frame expresses the object system with data having a three layer structure of frames, slots and values.

For instance, the first line means that the values of the slot which is one of the components of the frame S1 are {B1, B2, ... F2}. The symbol {} means list construction data which store a plurality of elements.

FIG. 4 shows an example of the lower hierarchy frame. The frame describes the higher hierarchy (slot name is UPPER SYSTEM) of the filter F1, including the line (piping, same hereinafter) where the F1 is installed, input device, output device, and the names of the functions which express the relationship between input and output.

FIGS. 5 and 6 show examples of rules which execute reasoning using above described data.

In FIG. 5, an example of shallow knowledge, namely, an approximate rule, is shown. In the example, the following three types of approximate rules are considered.

Type (1) : Output change of the subsystem is obtained from internal state change of the subsystem.

Type (2) : Output change of the subsystem is obtained from input change of the subsystem.

Type (3) : Internal state change of the subsystem is obtained from input change of the subsystem.

FIG. 5 is the rule of the above described type (2). The rule comprises rule name, premise parts ("if"parts), and concluding parts ("then"parts). In the premise parts, a conditional proposition for referring slot values of the frame is described, and, in the concluding parts, an order for renewal of the slot values of the frame is described.

In the premise parts ("if"parts), stop line of the subsystem S2 and input change of B3 which is an entrance of the subsystem (take change of flow rate, temperature, and pressure for the input change 1, 2 and 3) are described. In the concluding parts ("then"parts), an order to be written in B4 which is an exit of the subsystem is described. The mark "[+]" written by the slot values means "increment", and "[0]" means "no change". B4 is the frame name. The mark "@" signifies the name of the slot. For instance, the first line condition means "the value of STOP_LINE slot of the frame S2 includes the PIPING 04". And the operator means "equal", and "*" means (hereinafter in the same manner). By using the approximate rule shown in FIG. 5, the output change of B4, the exit of the subsystem, can be induced directly from the input change of B3, the entrance of the subsystem, and accordingly, it is not necessary to calculate input and output of the internal devices. Therefore, the reasoning can be achieved fast. If an approximate rule does not exist, the detail rule explained subsequently is executed, and the approximate rule is generated.

In FIG. 6, an example of the detail rule is shown. The rule is for execution a function "exec-func" which is described in ?DEVICE_X frame using device name (?DEVICE_X) and its input change ?X1, ?X2 and ?X3 as parameters when the input change of any device (?DEVICE_X) is calculated and the output change is not defined. The mark "?" means a variable. A function "exec-func" calculates the output change from the input change of the ?DEVICE_X.

FIG. 7 is an example of the rule for generating an approximate rule, and the approximate rule is generated when a result which satisfies the relationship between the premise part and the concluding part of the approximate rule is obtained.

The rule is for execution of the "make-rule 1" function using ?DEVICE_X and ?DEVICE_Y as parameters when ?DEVICE_X is the entrance of ?SUBSYSTEM and ?DEVICE_Y is the exit of ?SUBSYSTEM and if both the input change of ?DEVICE_X and the output change of ?DEVICE_Y have been calculated. The function "make-rule" generates a rule for calculating output change of the ?DEVICE_Y from the input change of the ?DEVICE_X.

Embodiment 1

Hereinafter, the reasoning system by knowledge activation of the present invention is explained by describing the example using the system for support of maintenance work planning for a plant.

When a plurality of maintenance work is are executed in a plant, it is necessary to determine whether or not such work will have a disruptive influence upon other work, that is, whether it interferes or not. For instance, in the plant system shown in FIG. 2, for inspection of the pump P1, operation of the P1 is changed to the P2 and the inspection is executed, and subsequently, the changing work of the P2 with P1 is determined as the primary work. The inspection of the flow meter M1 is determined to be the secondary work. The primary work consists of following operation:

(1) Open the valves, V7, V8
(2) Start the pump P2
(3) Stop the pump P1
(4) Close the valves, V5, V6
(5) Inspect the pump P1
(6) Open the valves, V6, V5
(7) Start the pump P1
(8) Stop the pump P2
(9) Close the valves, V7, V8

As a premise condition for execution of the secondary work, the flow rate of water to PLR pump through the valve V18 must be kept constant (change of flow rate is zero).

FIG. 8 is a flow chart for judging the interference described above. At the procedures 81, 82, content and work condition of the device operation are set. In the procedure 83, a starting point of the condition change is set at the operation device, and a terminating point is set at the evaluating place of the working effect. Also, starting phenomena of the stage change propagation is set. In the above example, the valve V7, V8, and the pump P2 etc. are the starting points, and the inlet of the PLR pump is the terminating point.

The procedure 84 determines whether the approximate rule which is usable for the state change propagation exists or not, and if it exists,, the approximate rule is executed by the procedure 85, but if not, the detailed reasoning at 86 is executed. By the procedure 87, the approximate rule is generated and registered in the knowledge base if a result which satisfies the relationship between the premise part and the concluding part of the approximate rule is obtained by the detailed reasoning. At the time when the propagation of the condition comes to the terminating point, the procedure 89 judges whether the state change violates the working condition (flow rate is zero in this example) or not, that is, whether the interference exists or not. The above described procedures are repeated for all the above mentioned device operations, and the result is displayed by the procedure 803.

Figure 9A:
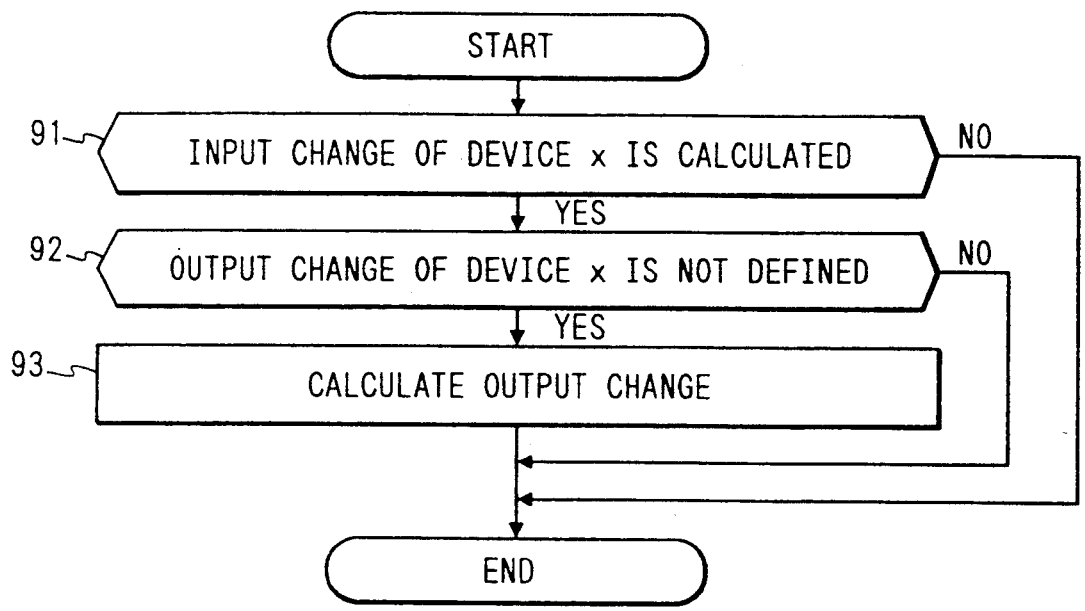
Figure 9B:
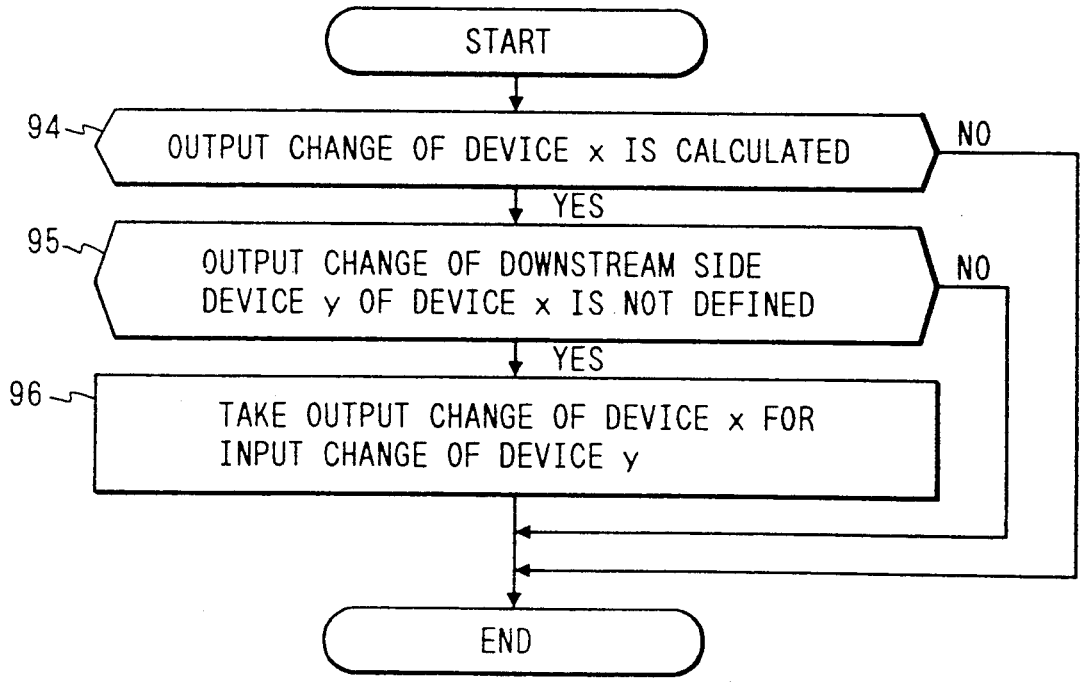

FIG. 9 is a flow chart of reasoning using detailed knowledge, namely, detailed reasoning part. In accordance with FIG. 9(a), if there are devices for which input changes have been calculated but output changes have not been defined, output change of the devices are then calculated. In accordance with FIG. 9(b), if there are devices for which output changes have been calculated and input changes of the subsequent downstream side device (the output device defined OUTPUT_DEVICE_1 slot of the frame shown in FIG. 4) are not yet defined, output change of the former is placed as the input change for the latter. By repeating the procedures in FIG. 9(a) and 9(b), the state change caused by the operation of the starting device can be propagated to the downstream side device successively. The above described procedures should not be applied to such device in which liquid is not flown through a closed valve.

Figure 10:
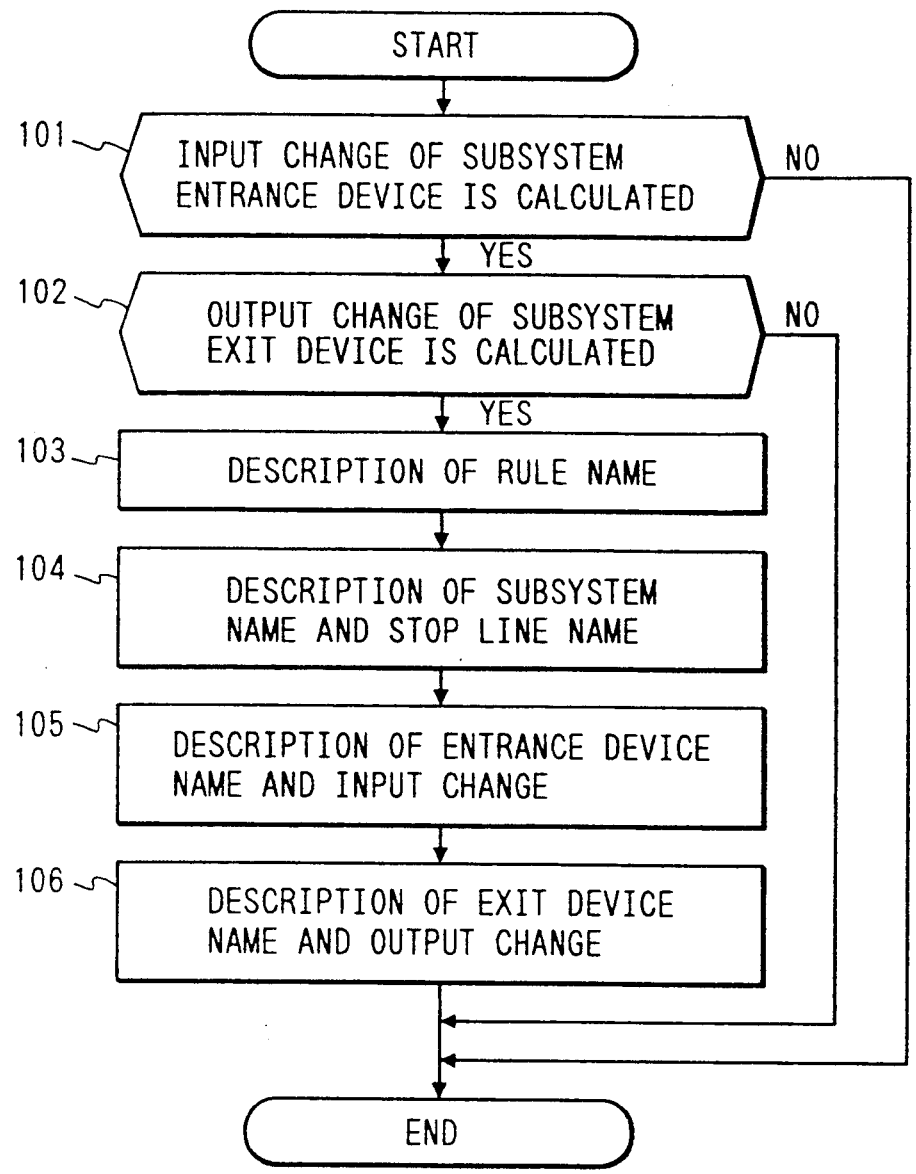
FIG. 10 is a flow chart of an approximate rule generation part.

FIG. 10 is a flow chart of a rule generation part. The rule generation part judges whether or not input change of such an entrance device as the subsystem S3, S4 etc. and output change of an exit device have been calculated by using the rule such as the example shown in FIG. 7. If it has been calculated, the approximate rule such as the example shown in FIG. 5d is generated. That is, the procedure 101 and 102 in FIG. 10 execute the above described judgement, and the procedure from 103 to 106 generates the rule which describes name of the rule, name of the subsystem, stop line, name of the entrance device, input change in the premise part, name of the exit device and output change in the concluding part, and the rule is written into the approximate rule storage shown in FIG. 1. The rule generation function, such as the example shown in FIG. 7, executes the above described procedures from 103 to 106.

In the above described processes for interference judgement, the same processes appear repeatedly in regard to propagation of state change at the subsystem S3 and S4 etc. That is, open-close operation of the valves in the above described device operation (1), (4), (6) and (9) cause fluctuation of flow rate at the inlet of the subsystem S3 (outlet the S2). Moreover, starting of the pumps of (2) and (7) increments the flow rate, and stopping the pumps of (3) and (8) decrease the flow rate. When same state changes appear repeatedly in this manner, it is necessary to execute detailed reasoning for the first state change propagation, but since the approximate rule can be used for the second and subsequent state change propagations, the processing can be accelerated.

Embodiment 2

Next, an embodiment of application of the reasoning system by knowledge activation of the present invention to diagnosis of a plant is explained.

Figure 11:
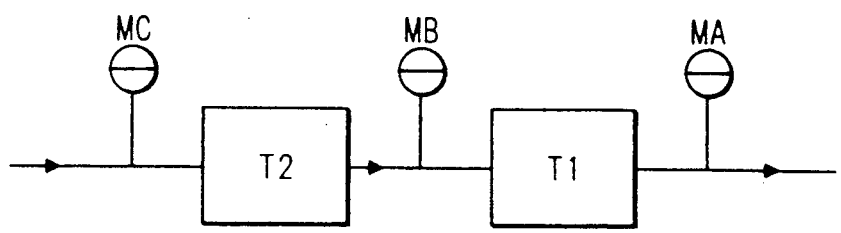
FIG. 11 is a drawing showing an example of plant system and instruments arrangement.

In FIG. 11, T1 and T2 are subsystems, and MA, MB and MC are instruments. An example is considered, in which an observed value of the instrument MC indicates an abnormality and the causes are investigated. If the abnormality of the device propagates to the downstream side, the device which causes the abnormality of the observed value of the MA exists at T1, T2 or further upstream side.

Figure 12:
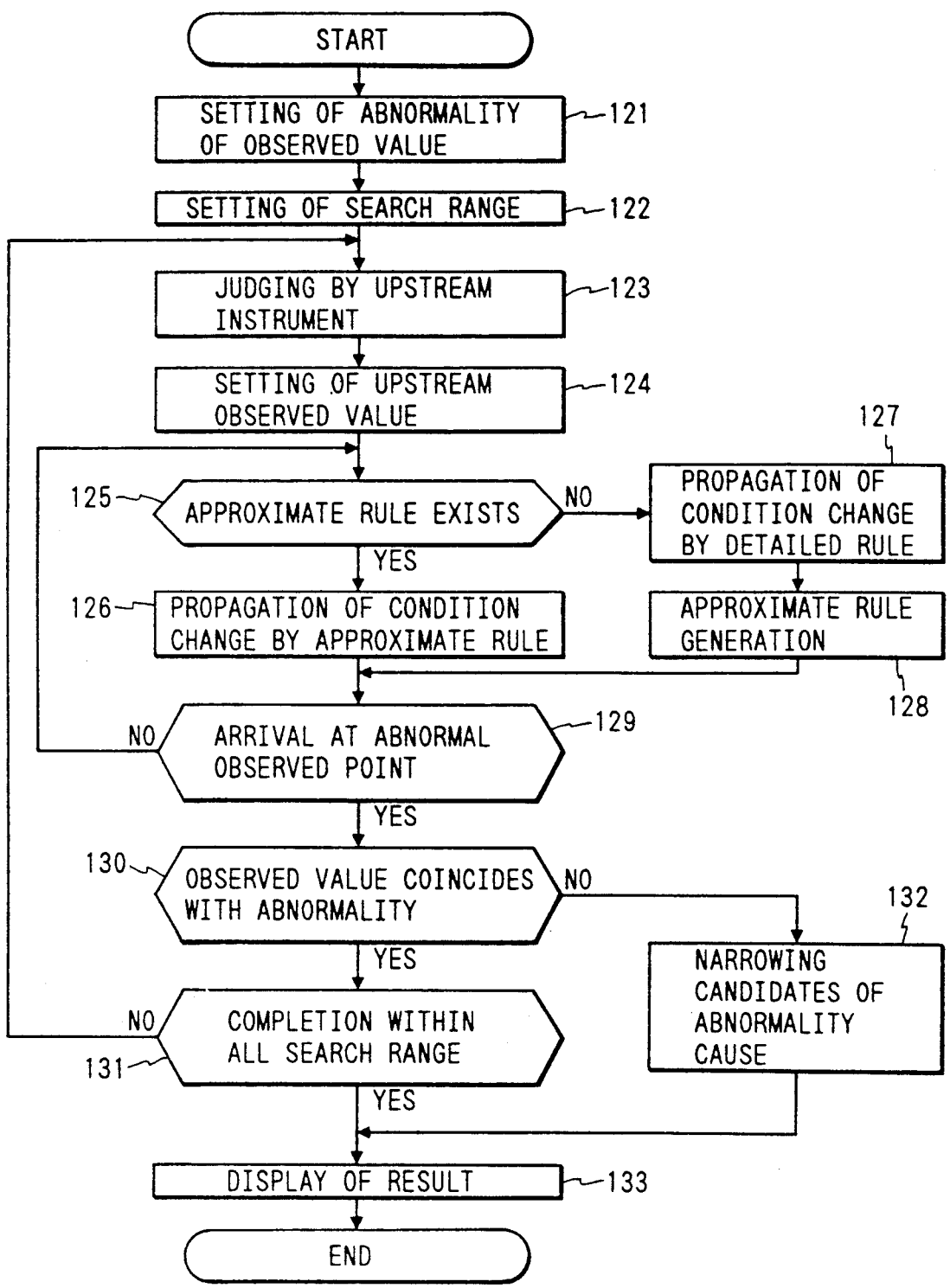
FIG. 12 is a flow chart showing the content of the processing when the reasoning system by knowledge activation of the present invention is applied to a failure diagnosis for a plant.

FIG. 12 is a flow chart for investigating the possible causes of the abnormality. The flow chart shown in FIG. 12 shows procedures for specifying the causes of the abnormality by determining the instruments located upstream side of the instrument which record the abnormality, propagating the state change to the downstream side based on the observed value of the upstream side instruments, and judging whether a result coinciding with the abnormality can be obtained or not. For instance, if the change of the observed value by the MB is very small and abnormality of the observed value by the MA is not detectable by the observed value by the MB, the device which causes the abnormality is narrowed to the device in the subsystem T2.

In the above described diagnosis process, the process 126 propagates the state change in blocks of a subsystem by using the approximate rule. If the approximate rule does not exist, the process 127 propagates the state change to each of the devices by using the detailed rule, and then, the process 128 generates the approximate rule.

Figure 13:
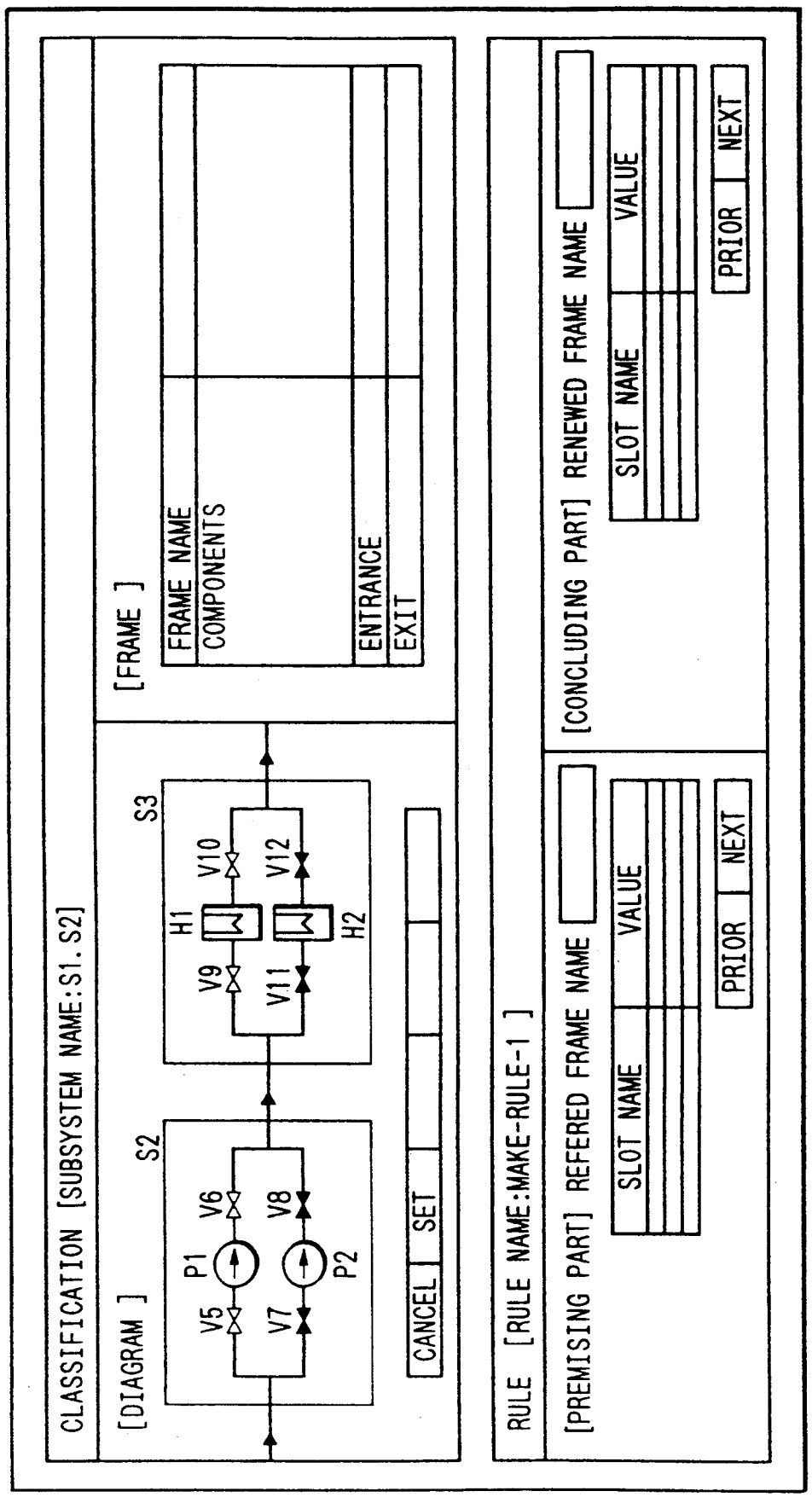
FIG. 13 is an illustration shown an example of a display screen for correcting the relationship between the premise part and the concluding part of the approximate rule and hierarchy composition of the target system.
Figure 14:
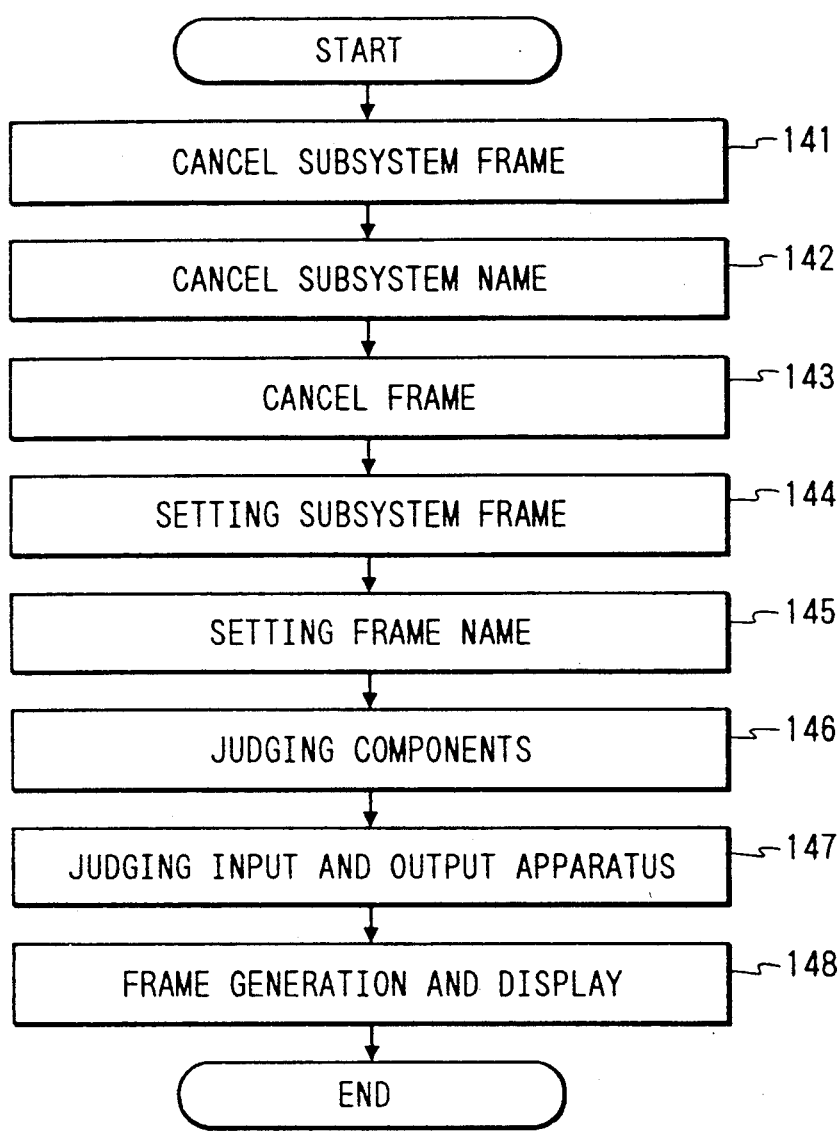
FIG. 14 is a flow chart of the above described correction.
Figure 15A:
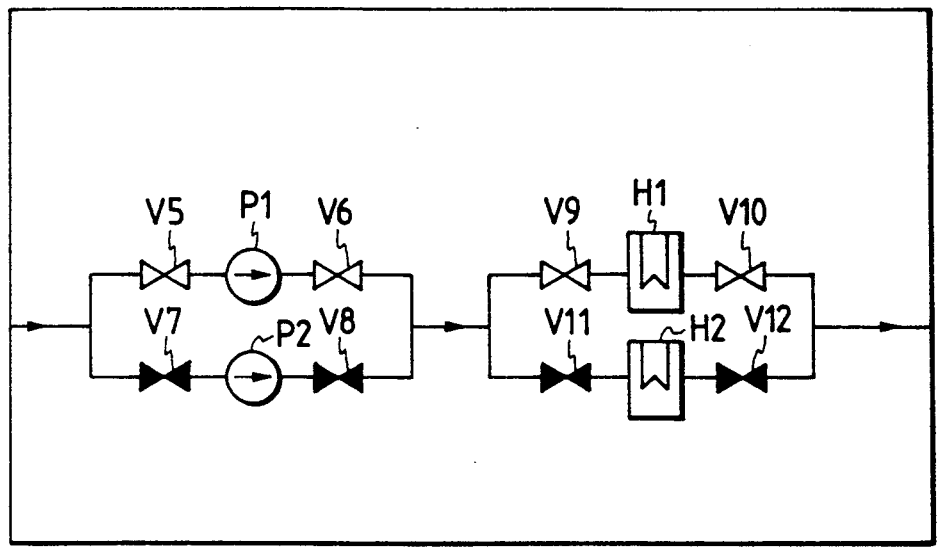
FIGS. 15 (a) and 15 (b) are illustrations for explanation of the display screen change.
Figure 15B:
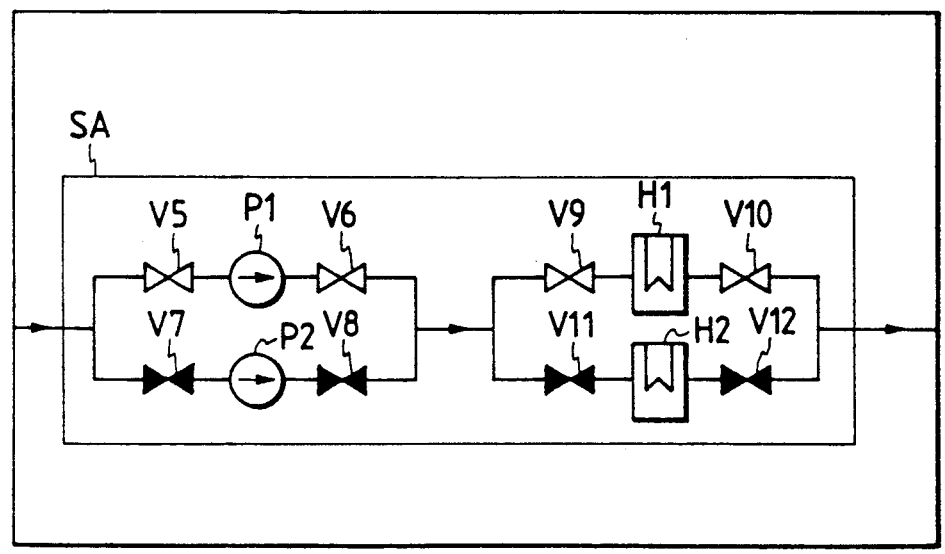

As the above explanation clarifies, the reasoning system by knowledge activation of the present invention is able to generate the approximate rule by itself, and it is not necessary to prepare the previous users. Further, the content of the processing by the approximate rule can be easily changed by correcting the hierarchical composition of the object system, or correcting the condition which should be satisfied by the premise part and the concluding part of the approximate rule. An example of a CRT display screen composition for execution of the above described correction is shown in FIG. 13. In the example, a window is arranged for correction of the hierarchical composition at the upper part of the screen. For correction of the hierarchical composition, change the range (a rectangular frame) of the subsystem such as S1, S2 etc., and then correct the content of the frame depending on the result of the range change. Examples of a flow chart and the content of the correction for the diagram correction are shown in FIGS. 14 and 15. In FIG. 14, the procedure 141 eliminates the rectangular frame which shows the range of the route displayed on FIG. 13 by order of the user. Subsequently, the name of the subsystem and frame corresponding to the eliminated rectangular frame is eliminated by the procedures 142 and 143. At this point, the diagram shown on FIG. 13 becomes as FIG. 15 (a). The processes 144 and 145 set a newly defined range of the subsystem and name of the frame by order of the user. Then the diagram shown on FIG. 13 becomes as FIG. 15 (b). The procedures 146 and 147 determine which devices are included in the range of the subsystem SA which is designated in FIG. 15 (b), namely the components of the subsystem, and which device is located at the entrance and exit of the subsystem, and describe the name of each device in the COMPONENTS slot, ENTRANCE slot, and EXIT slot of the frame SA. The content of the prepared frame is displayed on the window shown at upper right of FIG. 13.

A window for correcting a condition to be satisfied by the premise part and concluding part of the approximate rule is arranged at the lower region of FIG. 13. The processing content of the approximate rule can be changed by correcting the frame name, slot name, value of the slot, which are referred and renewed in the rule, and name of the function to execute the process of the procedure. For instance, the rule shown in FIG. 7 describes in the processing part for preparation of the approximate rule using the function "make_rule_1" under a condition that input change of the entrance device and output change of the exit device have been calculated. The content of the rule is corrected as shown in FIG. 16, for example, in the window at the lower region of FIG. 13. The rule shown in FIG. 16 indicates preparation of the type (1) rule which is one of the approximate rules classified into three types previously, namely, the rule for obtaining output change of the subsystem (output change of the exit device of the subsystem) from the change of internal state change of the subsystem (output change of the operated device). Additionally, the user designates whether the corrected rule is newly registered or the prior uncorrected rule is replaced with the corrected rule.

Furthermore, the reasoning system by knowledge activation of the present invention is able to prepare a new rule by extracting changeable conditions from the premise part of the approximate rule and changing the conditions. For instance, FIG. 17 is an example of changing the stop line from PIPING_04 to PIPING_03 among condition items of the rule shown in FIG. 5. Such a rule as described above is easily generated by using symmetrical feature of the system construction without using detailed reasoning. And, from the characteristics of input/output of the device, it is possible to generate new rules by extracting rules which are able to consist even in the case when an operation to change the value of the INPUT_CHANGE 1 from "[+]" to "[−]" is executed and changing the condition of the rule.

Further, when a plurality of different condition items which lead to same conclusion exist in the approximate rule, it is possible to unite the items together and convert the items to a condition item of higher grade concept. For instance, in the device of the subsystem S2 shown in FIG. 2, even when the value V7 is closed or the case when the value V8 is closed, behavior of the subsystem S2 makes no difference. Therefore, the condition can be represented by the condition that the PIPING_04, in which V7 and V8 are installed, is a stop line. The frame and the rule exampled previously are represented in this manner.

What is claimed is:

1. A reasoning system for reasoning by knowledge activation, to be applied to a target system, said reasoning system comprising:
an input/output apparatus for exchanging information with said target system;
a memory apparatus for hierarchically storing said information from said input/output apparatus and processing programs; and
a processing apparatus for processing said stored information by executing said processing programs,
wherein said information stored in said memory apparatus comprises:
approximate reasoning rules for application in a higher grade hierarchy of reasoning, detailed reasoning rules for application in a lower grade hierarchy of reasoning, and
wherein said processing programs stored in said memory apparatus comprises:
programs for executing said detailed reasoning rules at said lower grade hierarchy for reasoning when a premise part of an assigned approximate reasoning rule has not been established, programs for generating said approximate reasoning rule when said premise part of said generated approximate reasoning rule has been established by execution of said detailed reasoning rules, and a relationship between said established premise part and a concluding part of said generated approximate reasoning rule has been satisfied, and programs for executing said generated approximate reasoning rule at said higher grade hierarchy for reasoning, wherein if conditional items of said approximate reasoning rules are found not to exist, said generated approximate reasoning rule is generated after execution of said detailed reasoning in a lower grade hierarchy of reasoning.

2. A method of composing a reasoning system for reasoning by knowledge activation, to be applied to a target system, said method comprising the steps of:

dividing said target system into a hierarchical structure;

creating approximate reasoning rules for application to a higher grade hierarchy of said hierarchical structure;

creating detailed reasoning rules for application to a lower grader hierarchy of said hierarchical structure;

executing said detailed reasoning rules when a premise part of said approximate reasoning rules has not been established;

generating an approximate reasoning rule when said established premise part of said generated approximate reasoning rule has been established and a relationship between said established premise part and a concluding part of said generated approximate reasoning rule has been satisfied;

executing said generated approximate reasoning rule;

naming said generated approximate reasoning rule; and storing said named generated approximate reasoning rule.

3. A method of composing a reasoning system for reasoning by knowledge activation as in claim 2, wherein said approximate reasoning rules describe a hierarchical structure of said target system and describe causes and effects of state changes in at least a system or subsystem, and said detailed reasoning rules use detailed knowledge at said lower grade hierarchy of reasoning.

4. A method of composing a reasoning system for reasoning by knowledge activation as in claim 2, further comprising the steps of:

transmitting said relationship between said established premise part and said concluding part of said generated approximate reasoning rule via an input/output device, to a display screen; and initiating processing of said generated approximate reasoning rule by correcting and satisfying said relationship between said premise part and said concluding part of said generated approximate reasoning rule on said display screen.

5. A method of composing a reasoning system for reasoning by knowledge activation as in claim 2 wherein if conditional items of said approximate reasoning rules are found not to exist, said generated approximate reasoning rule is generated by execution of said detailed reasoning in said lower grade hierarchy of reasoning.

6. A method of composing a reasoning system for reasoning by knowledge activation as in claim 2 wherein said procedure provides a plurality of different conditional items, all of which bring about a same conclusion among a plurality of generated approximate reasoning rules, and consolidates said plurality of different conditional items so as to be a singular conditional item of a higher grade concept.

7. A method of composing a reasoning system for reasoning by knowledge activation, to be applied to a target system, said method comprising the steps of:

dividing said target system into an upper grade hierarchy, wherein approximate reasoning rules are included, and lower grade hierarchy wherein detailed reasoning rules are included;

executing detailed reasoning rules when a premise part of said approximate reasoning rules has not been established;

generating an approximate reasoning rule when said established premise part of said generated approximate reasoning rule has been established and a relationship between said established premise part and a concluding part thereof has been satisfied;

executing said generated approximate reasoning rule;

naming said generated approximate reasoning rule; and storing said named generated approximate reasoning rule.

8. A reasoning system for reasoning by knowledge activation, to be applied to a target system divided into a hierarchical structure, said reasoning system comprising:

a memory apparatus for hierarchically storing shallow knowledge and deeper knowledge of said target system and for storing a reasoning program for reasoning either of said shallow knowledge or said deeper knowledge;

a processing apparatus for processing said reasoning program; and an input/output apparatus for inputting said hierarchical structure into said reasoning system and for outputting results of said processing apparatus, wherein said memory apparatus stores information comprising:

programs for processing said shallow knowledge when a premise part of an approximate reasoning rule has been established, programs for processing said deeper knowledge when said shallow knowledge for said reasoning programs does not exist, programs for substituting said executed deeper knowledge as new shallow knowledge when said shallow knowledge for said reasoning programs does not exist, and programs for storing said reasoned knowledge;

wherein if conditional items of said reasoning rule are found not to exist, said approximate reasoning rule is generated after execution of said detailed reasoning in a lower grade hierarchy of reasoning.

* * * * *